(12) United States Patent
Haller (10) Patent No.: US 8,267,641 B2
(45) Date of Patent: Sep. 18, 2012

(54) GAS TURBINE

(75) Inventor: Brian Haller, Panton (GB)

(73) Assignee: Siemens Aktiengesellschaft, Munich (DE)

(*) Notice: Subject to any disclaimer, the term of this patent is extended or adjusted under 35 U.S.C. 154(b) by 517 days.

(21) Appl. No.: 12/524,597

(22) PCT Filed: Jan. 29, 2008

(86) PCT No.: PCT/EP2008/051015
§ 371 (c)(1),
(2), (4) Date: Jul. 27, 2009

(87) PCT Pub. No.: WO2008/092845
PCT Pub. Date: Aug. 7, 2008

(65) Prior Publication Data
US 2010/0119357 A1    May 13, 2010

(30) Foreign Application Priority Data

Jan. 31, 2007 (GB) .................................. 0701737.9

(51) Int. Cl.
*F03B 11/00* (2006.01)
*F01D 5/14* (2006.01)
*F01D 5/18* (2006.01)
*F01D 5/20* (2006.01)
*F01D 5/08* (2006.01)
*F04D 29/38* (2006.01)

(52) U.S. Cl. ....................................... 415/115; 416/97 R
(58) Field of Classification Search .................. 415/115; 416/96 R, 97 R
See application file for complete search history.

(56) References Cited

U.S. PATENT DOCUMENTS

| | | | |
|---|---|---|---|
| 2,847,185 A | | 8/1958 | Petrie et al. |
| 3,045,965 A | | 7/1962 | Bowmer et al. |
| 4,522,557 A | | 6/1985 | Bouiller et al. |
| 6,102,658 A | * | 8/2000 | Kvasnak et al. ............ 416/97 R |
| 6,345,955 B1 | * | 2/2002 | Heffron et al. ................ 415/115 |
| 6,435,814 B1 | * | 8/2002 | Yu et al. ......................... 415/115 |
| 6,761,529 B2 | * | 7/2004 | Soechting et al. ............ 415/115 |
| 6,929,445 B2 | * | 8/2005 | Zatorski et al. ............... 415/115 |
| 7,004,720 B2 | * | 2/2006 | Synnott et al. ................ 415/115 |
| 2002/0122716 A1 | | 9/2002 | Beacock et al. |
| 2003/0167775 A1 | | 9/2003 | Soechting et al. |

FOREIGN PATENT DOCUMENTS

| | | |
|---|---|---|
| DE | 19733148 C1 | 11/1998 |
| EP | 0083896 A1 | 7/1983 |
| EP | 0980960 A2 | 2/2000 |
| EP | 1526251 A1 | 4/2005 |
| EP | 1657407 A1 | 5/2006 |
| EP | 1749967 A2 | 2/2007 |
| GB | 0881816 A | 11/1961 |
| GB | 938247 A | 10/1963 |

* cited by examiner

*Primary Examiner* — Edward Look
*Assistant Examiner* — Su Htay (57) ABSTRACT

A gas turbine including a rotor shaft, a plurality of rotor blades that extend generally radially outwardly from the rotor shaft, each rotor blade including a shroud radially outward of an aerofoil, and a plurality of guide vanes located adjacent to the plurality of rotor blades, the plurality of guide vanes also extending generally radially outwardly is provided. The guide vanes operate to direct gas flowing through the turbine onto the rotor blades. A guide vane accommodates a flow of cooling fluid to an aperture in the guide vane that is located in a region that is adjacent both the radially outer end of the guide vane and the trailing edge of the guide vane. The flow of cooling fluid emanating from the aperture travels to impinge upon the shroud thereby cooling the shroud. The aperture is located in the high or low pressure side of the guide vane.

11 Claims, 8 Drawing Sheets

GAS TURBINE

CROSS REFERENCE TO RELATED APPLICATIONS

This application is the US National Stage of International Application No. PCT/EP2008/051015, filed Jan. 29, 2008 and claims the benefit thereof. The International Application claims the benefits of Great Britain application No. 0701737.9 GB filed Jan. 31, 2007, both of the applications are incorporated by reference herein in their entirety.

FIELD OF INVENTION

The present invention relates to a gas turbine.

More particularly the present invention relates to a gas turbine comprising: a rotor shaft; a series of rotor blades that extend generally radially outwardly from the rotor shaft, each rotor blade including a shroud part radially outward of an aerofoil part; and a series of guide vanes disposed adjacent the series of rotor blades, the series of guide vanes also extending generally radially outwardly, the guide vanes operating to direct gas flowing through the turbine onto the rotor blades.

BACKGROUND OF INVENTION

Figure 1:
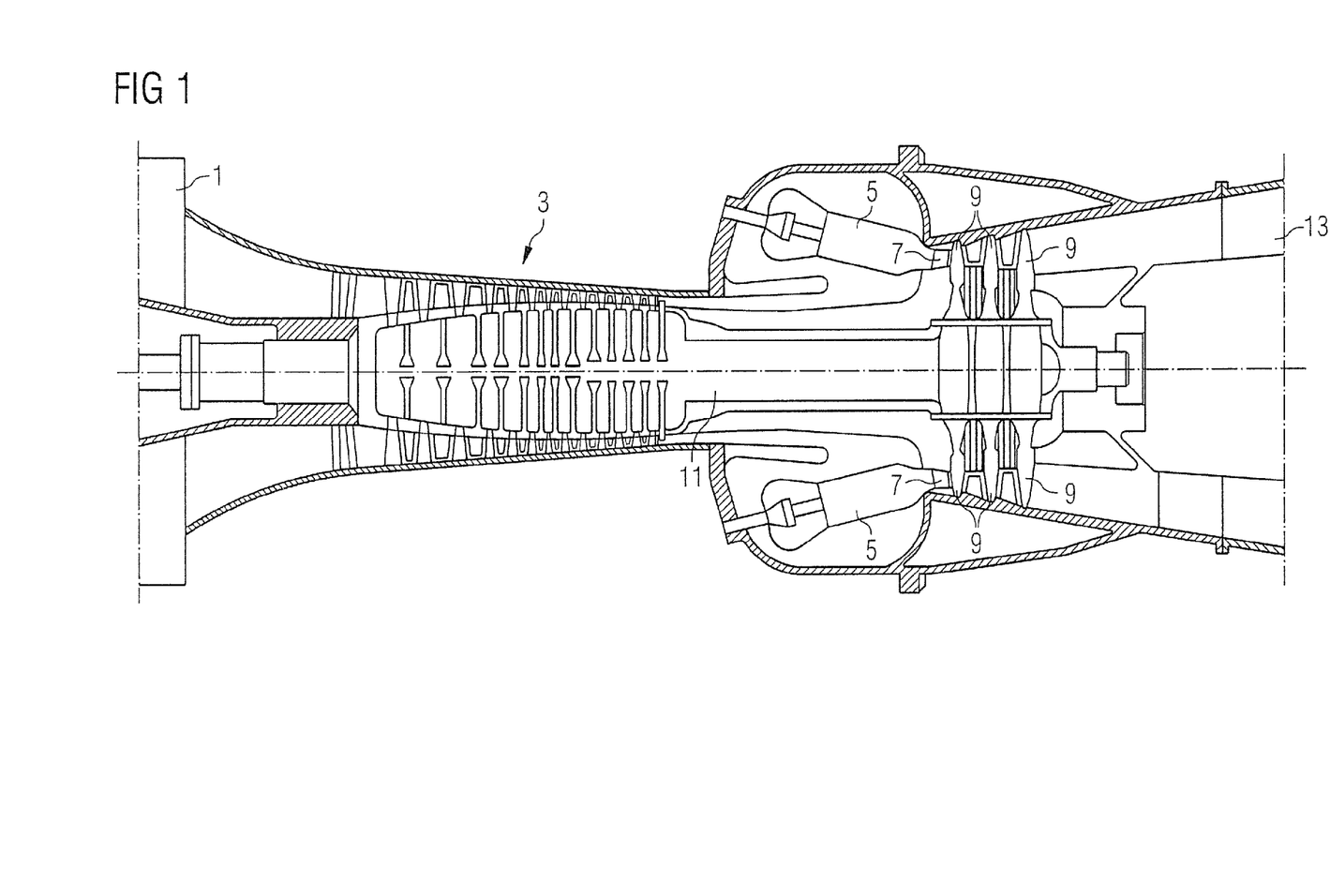
FIG. 1, already referred to, is a longitudinal cross section through a known gas turbine engine.

Such a gas turbine forms part of the known gas turbine engine shown in FIG. 1, which Fig is a longitudinal cross section through the engine. Referring to FIG. 1, the engine comprises an air inlet 1, a compressor stage 3, combustors 5, a series of guide vanes 7, a series of rotor blades 9, a rotor shaft 11, and an exhaust 13. Air enters air inlet 1, is compressed in compressor stage 3, and mixed with fuel and combusted in combustors 5. Hot gases produced by the combustion are directed by guide vanes 7 so as to drive rotor blades 9 and hence rotor shaft 11. Rotor shaft 11 both (i) provides mechanical torque so as to deliver the work done by the engine, and (ii) drives compressor stage 3 so as to draw further air in through air inlet 1. Following rotor blades 9, the hot gases leave the engine via exhaust 13.

Figure 2:
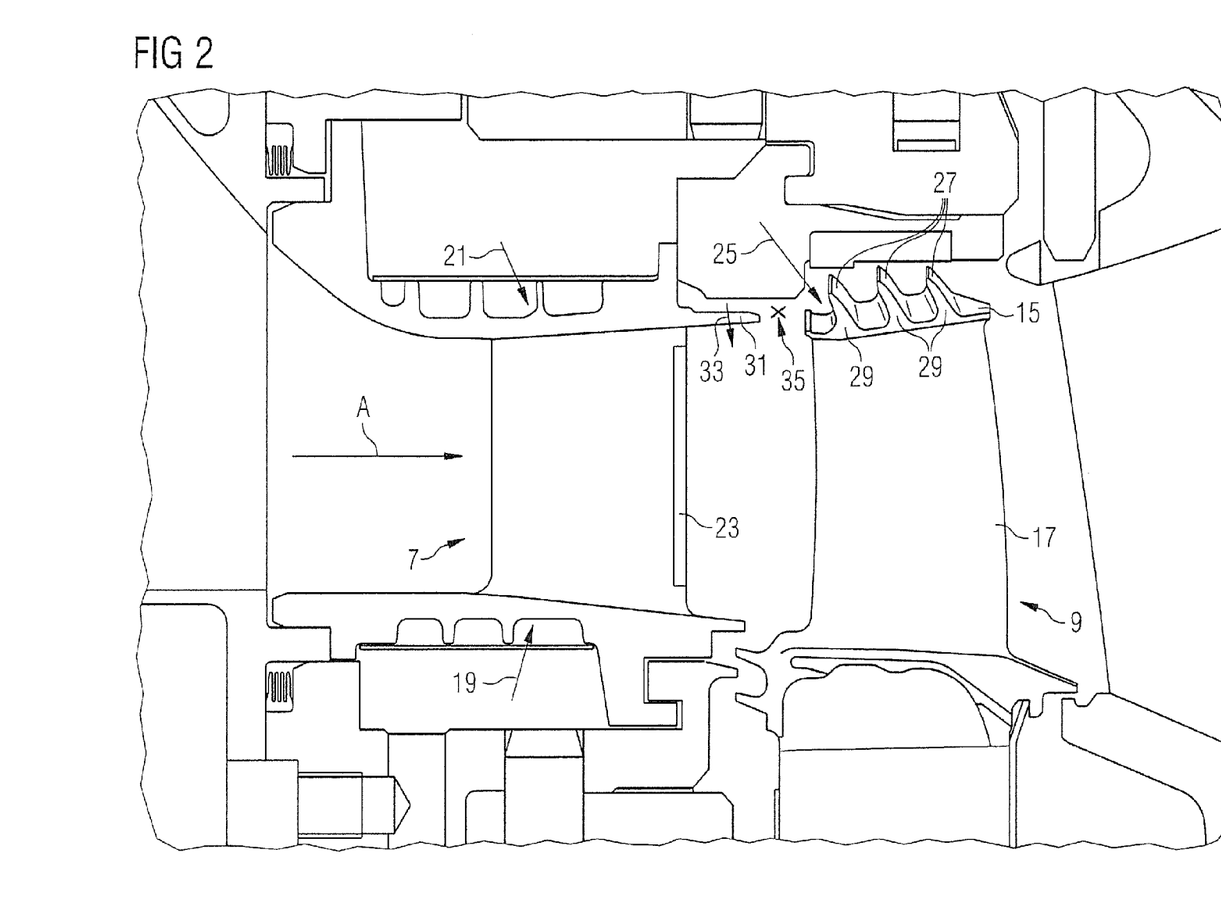
FIG. 2, also already referred to, illustrates in greater detail a part of the engine of FIG. 1, and includes depiction of a guide vane and rotor blade of the engine.

FIG. 2 illustrates in greater detail the part of the engine containing the guide vanes 7 and rotor blades 9. Hot gases pass in the direction of arrow A, being directed by guide vane 7 onto rotor blade 9. Rotor blade 9 includes a shroud part 15 and an aerofoil part 17. Guide vane 7 includes passageways there through by means of which a cooling fluid can be passed through the guide vane to cool it. Entrance to the passageways is via the radially inner and outer ends of the vane, as indicated by arrows 19, 21. Exit from the passageways is via slot 23.

It is desirable to cool the shroud part 15 of rotor blade 9 to increase the life of the blade. One attempt to do this comprised the supply of cooling fluid to the upstream end of the radially outer side of shroud part 15, as indicated by arrow 25. This was found to provide poor cooling as it tended to cool only the radially outer tips 27 of fins 29 of the shroud part. Another attempt to cool the shroud part comprised the supply of cooling fluid via holes in the so called platform 31 of the guide vanes, as indicated by arrow 33. This was also found to provide poor cooling as the cooling fluid tended to remain in region 35, swirling in this region and failing in large part to reach shroud part 15.

SUMMARY OF INVENTION

According to the present invention there is provided a gas turbine comprising: a rotor shaft; a series of rotor blades that extend generally radially outwardly from the rotor shaft, each rotor blade including a shroud part radially outward of an aerofoil part; and a series of guide vanes disposed adjacent the series of rotor blades, the series of guide vanes also extending generally radially outwardly, the guide vanes operating to direct gas flowing through the turbine onto the rotor blades, wherein at least one guide vane accommodates therein a flow of cooling fluid to an aperture in the guide vane that is located in a region of the guide vane that is adjacent both the radially outer end of the guide vane and the trailing edge of the guide vane, and wherein the flow of cooling fluid within the guide vane is substantially directly to the aperture to minimise heat transfer from the guide vane to the cooling fluid, in use of the turbine cooling fluid emanating from the aperture travelling to impinge upon the shroud parts of the rotor blades thereby to cool the shroud parts, wherein the aperture is located in the high or low pressure sides of the guide vane.

In a gas turbine according to the preceding paragraph it is preferable that the aperture is located in the high pressure side of the guide vane.

In a gas turbine according to either of the preceding two paragraphs it is preferable that the aperture is located both (i) in the radially outermost 20 percent of the guide vane, and (ii) in the axially most downstream 30 percent of the guide vane.

In a gas turbine according to any one of the preceding three paragraphs it is preferable that the flow of cooling fluid within the guide vane to the aperture originates from the radially outer end of the guide vane.

In a gas turbine according to any one of the preceding four paragraphs it is preferable that the guide vane, in addition to accommodating therein the flow of cooling fluid to the aperture, also accommodates therein a flow of cooling fluid that maximises heat transfer from the guide vane to the cooling fluid.

In a gas turbine according to the preceding paragraph it is preferable that the flow of cooling fluid that maximises heat transfer begins at the radially inner and outer ends of the guide vane and ends at the trailing edge of the guide vane.

In a gas turbine according to any one of the preceding six paragraphs the aperture may take the form of a slot or a series of holes.

In a gas turbine according to any one of the preceding eight paragraphs it is preferable that the at least one guide vane comprises substantially all the guide vanes of the turbine.

BRIEF DESCRIPTION OF THE DRAWINGS

The invention will now be described, by way of example, with reference to the accompanying drawings, in which.

DETAILED DESCRIPTION OF INVENTION

It has been realised in the present invention that a significant proportion of the gas flow reaching shroud parts 15 of rotor blades 9 derives from a certain region of each guide vane 7. In respect of each guide vane 7, this region is that adjacent both the radially outer end of the guide vane and the trailing edge of the guide vane. Thus, cooling fluid placed in this region ought to travel to shroud parts 15 cooling these parts.

Figure 3:
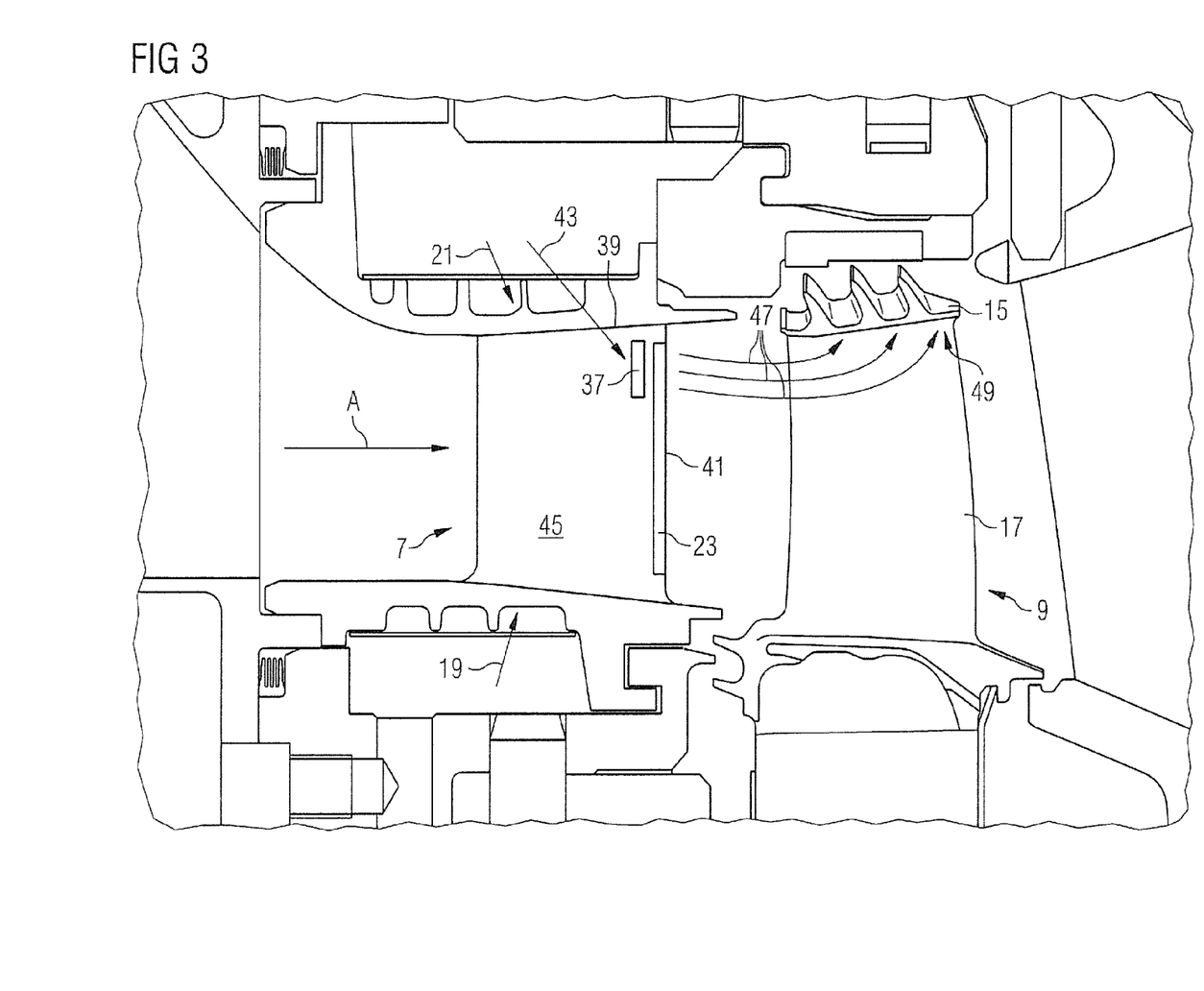
FIG. 3 is the same as FIG. 2 but includes the addition of a slot in the guide vane in accordance with the present invention.

Referring to FIG. 3, in accordance with the present invention, a slot 37 is faulted within guide vane 7 in a location that is adjacent both the radially outer end 39 of the guide vane and the trailing edge 41 of the vane. The slot is formed in the high pressure side 45 of the vane, and located both in the radially outermost 20 percent of the vane and in the axially most downstream 30 percent of the vane.

As indicated by arrow 43, a passageway is also formed within guide vane 7 from the radially outer end 39 of the vane to the slot 37. This passageway 43 is used to supply cooling fluid to slot 37. The passageway travels substantially directly to slot 37 to minimise heat transfer from guide vane 7 to the cooling fluid as the cooling fluid travels within the vane.

As indicated generally by arrows 47, cooling fluid emanating from the slot 37 travels to impinge on the radially inwardly facing side 49 of shroud part 15 thereby cooling the part.

Figure 4:
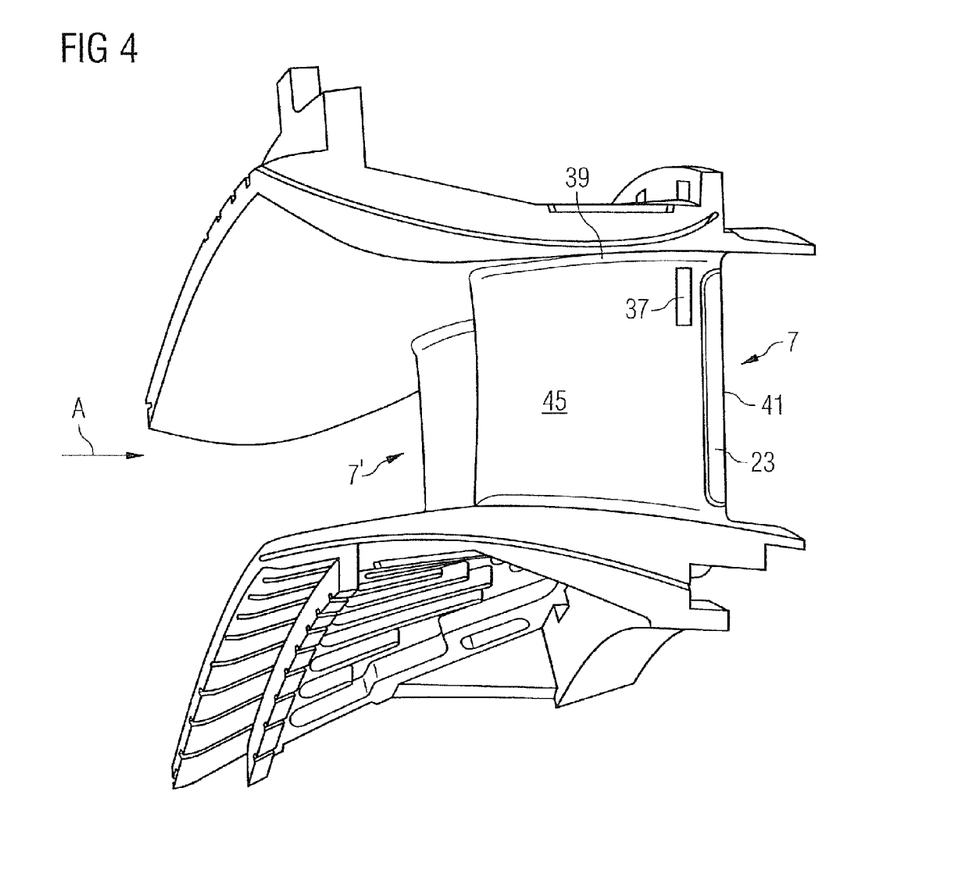
FIG. 4 is a perspective view of the guide vane shown in FIG. 3 and an additional adjacent guide vane.

The slot 37 can also be seen in FIG. 4. FIG. 4 also shows an additional guide vane 7' adjacent to guide vane 7.

Figure 5:
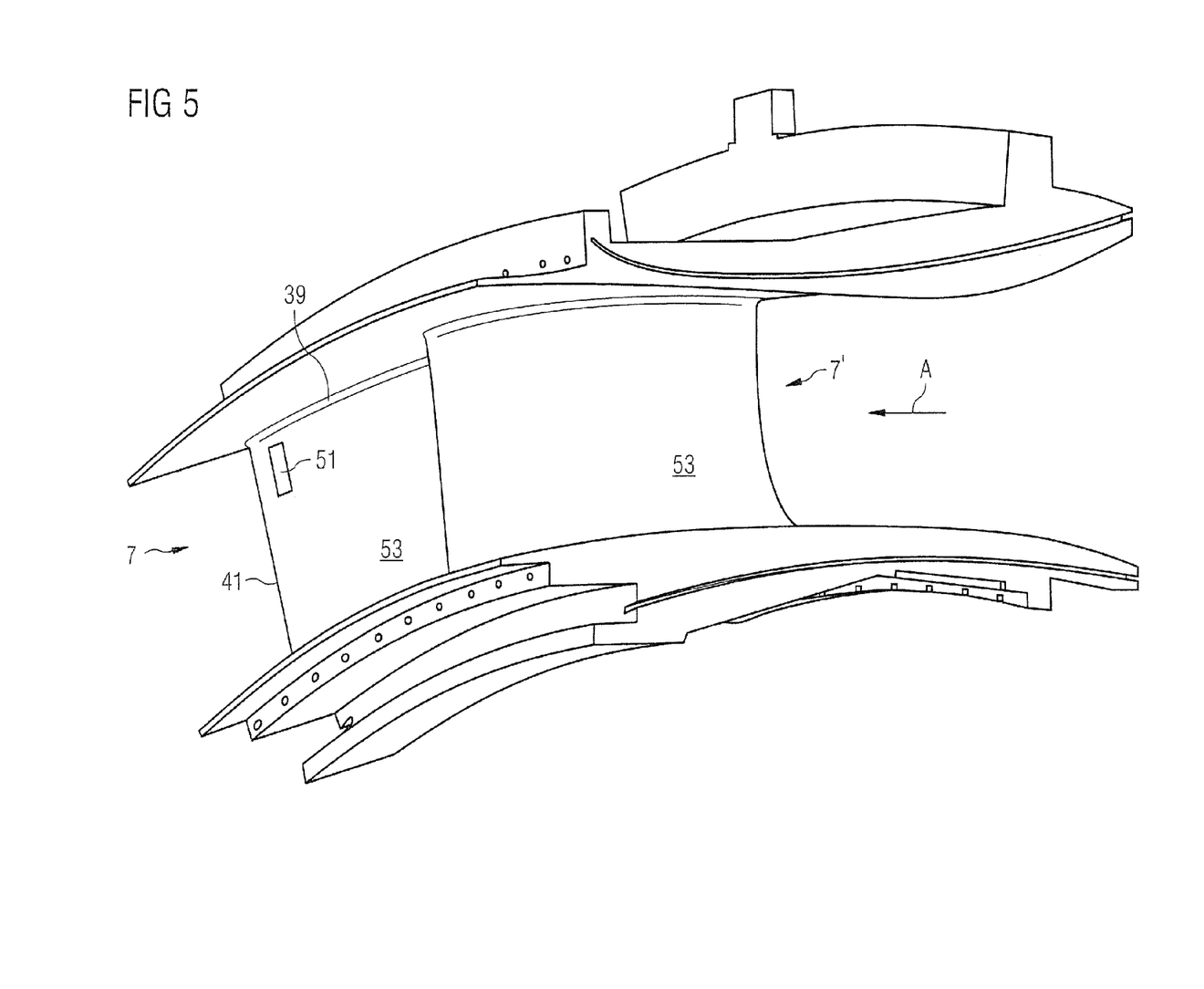
FIG. 5 is a further perspective view of the pair of guide vanes shown in FIG. 4.

FIG. 5 shows the low pressure sides 53 of guide vanes 7, 7'.

Figure 6:
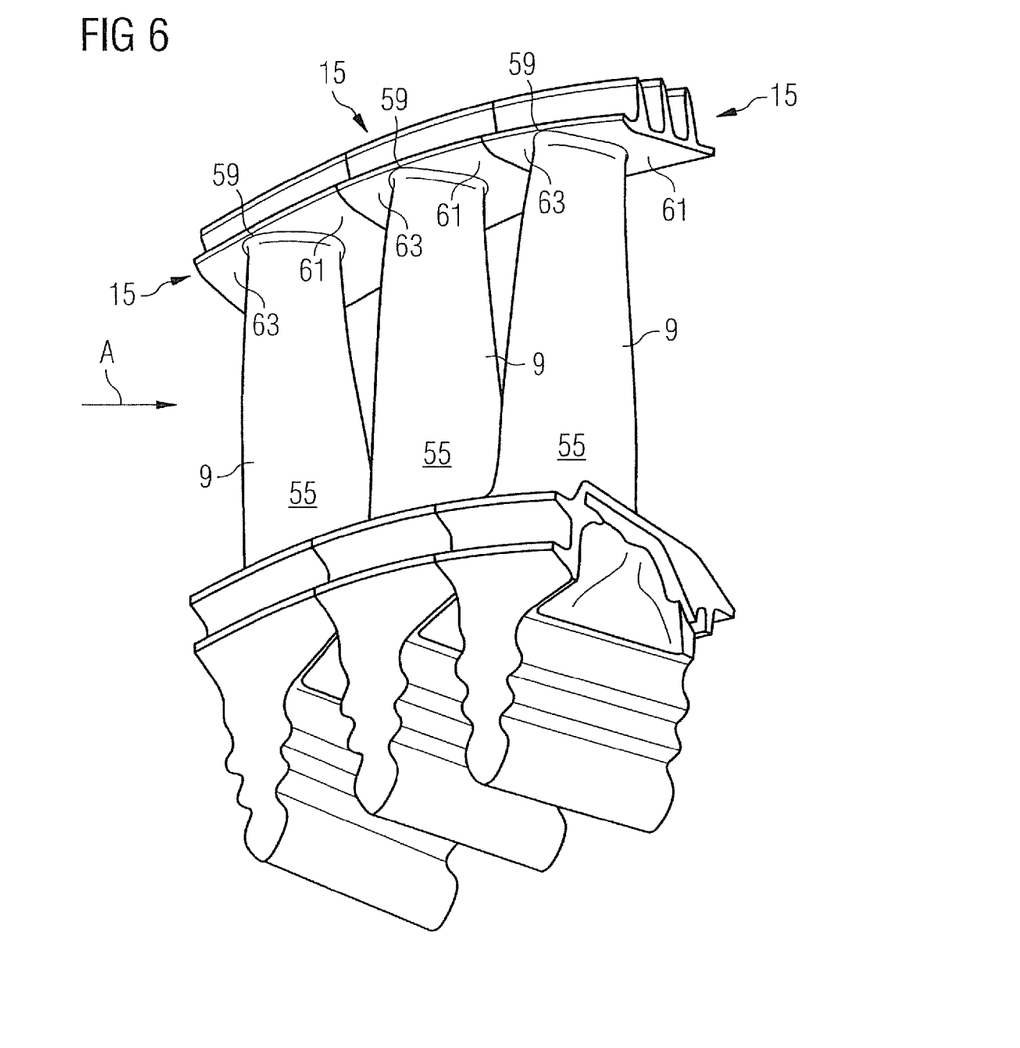
FIG. 6 is a perspective view of three adjacent rotor blades of the engine.

FIG. 6 shows the low pressure sides 55 of three adjacent rotor blades 9. The cooling fluid from slot 37 travels to impinge upon and cool: (i) the leading edges 59 of the shroud parts 15 of the three rotor blades 9, (ii), the regions 61 of the shroud parts 15 adjacent low pressure sides 55, and (iii) the regions 63 of the shroud parts adjacent the high pressure sides of the rotor blades.

Figure 7:
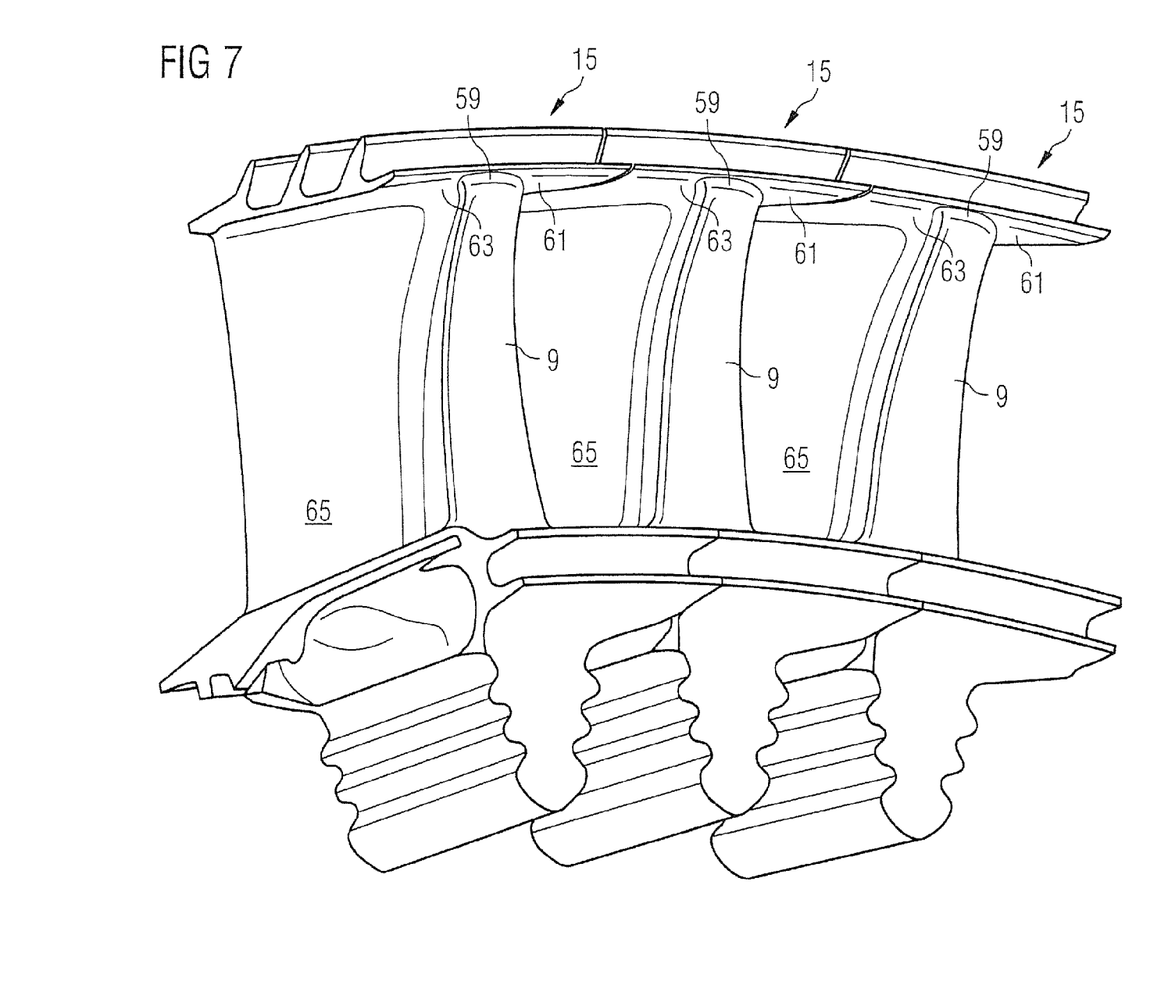
FIG. 7 is a further perspective view of the three adjacent rotor blades of FIG. 6.
Figure 8:
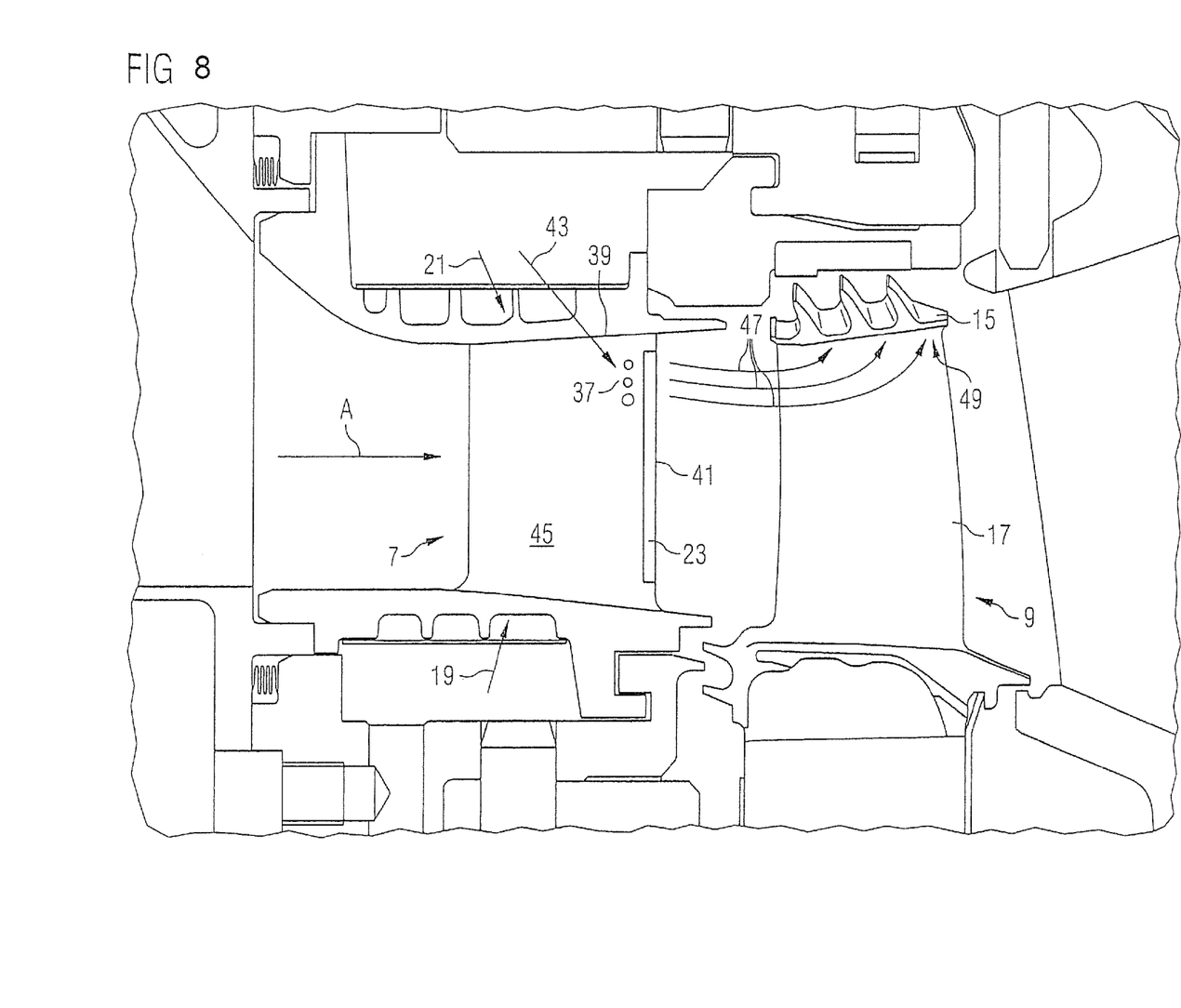
FIG. 8 is the same as FIGS. 2 and 3 but includes the addition of a series of holes in the guide vane in accordance with the present invention.

FIG. 7 shows the high pressure sides 65 of the three rotor blades 9.

All guide vanes 7 of the turbine include a slot 37.

It is to be noted that slot 37, instead of being located in the high pressure side 45 of a guide vane 7, could be located in a corresponding position in the low pressure side 53 of the vane, i.e. could be located in the low pressure side of the vane adjacent both the radially outer end 39 of the vane and the trailing edge 41 of the vane. Slot 51 in FIG. 5 is located in such a position.

Slot 37 could be replaced by an equivalent series of holes. Indeed, the slot could be replaced by any aperture that delivers cooling fluid as required adjacent the radially outer end and trailing edge of the guide vane.

Not all guide vanes 7 of the turbine need have a slot 37. The number of vanes requiring a slot depends on the degree of cooling required.

The invention claimed is:
1. A gas turbine, comprising:
 a rotor shaft;
 a plurality of rotor blades that extend generally radially outwardly from the rotor shaft, each rotor blade comprises:
  an aerofoil:
  a shroud, radially outward of the aerofoil; and
  a plurality of guide vanes located adjacent to the plurality of rotor blades, the plurality of guide vanes extending generally radially outwardly,
  wherein the plurality of guide vanes direct gas flowing through the gas turbine onto the plurality of rotor blades,
 wherein a guide vane accommodates a first flow of a cooling fluid to an aperture in the guide vane that is located in a first region of the guide vane that is adjacent to both a radially outer end of the guide vane and to a trailing edge of the guide vane,
 wherein the first flow of cooling fluid within the guide vane is substantially directed to the aperture to minimize heat transfer from the guide vane to the cooling fluid,
 wherein the first flow of cooling fluid emanating from the aperture travels to impinge upon the shroud of the rotor blade thereby the shroud, and
 wherein the aperture is located in a high pressure side or a low pressure side of the guide vane,
 wherein the guide vane accommodates a second flow of cooling fluid that maximizes heat transfer from the guide vane to the second flow of cooling fluid, and
 wherein the second flow of cooling fluid begins at an radially inner end and the radially outer end of the guide vane and ends at the trailing edge of the guide vane.

2. A gas turbine as claimed in claim 1, wherein the aperture is located in the high pressure side of the guide vane.

3. A gas turbine as claimed in claim 1, wherein the aperture is located in the low pressure side of the guide vane.

4. A gas turbine as claimed in claim 1, wherein the aperture is located both in a radially outermost 20 percent of the guide vane and in a most axially downstream 30 percent of the guide vane.

5. A gas turbine as claimed in claim 1, wherein the first flow of cooling fluid within the guide vane to the aperture originates from the radially outer end of the guide vane.

6. A gas turbine as claimed in claim 5,
 wherein a passageway is formed within the guide vane and extends from the radially outer end of the guide vane to the aperture,
 wherein the passageway supplies the first flow of cooling fluid to the aperture, and
 wherein the passageway extends substantially directly to the aperture.

7. A gas turbine as claimed in claim 1, wherein the aperture is a slot.

8. A gas turbine as claimed in claim 1, wherein the aperture is a plurality of holes.

9. A gas turbine as claimed in claim 1, wherein each guide vane of the plurality of guide vanes comprises an aperture.

10. A gas turbine as claimed in claim 1, wherein the first flow of cooling fluid emanates from the aperture and travels to impinge upon a radially inward facing side of the shroud.

11. A gas turbine as claimed in claim 1, wherein the first flow of cooling fluid impinges upon and cools a leading edge of the shroud, a second region of the shroud adjacent to a low pressure side, and a third region of the shroud adjacent to a high pressure side of the rotor blade.

* * * * *